(12) United States Patent
Jagannath et al.

(10) Patent No.: US 11,400,592 B2
(45) Date of Patent: Aug. 2, 2022

(54) METHOD AND SYSTEM FOR TASK EXECUTION IN DYNAMIC HETEROGENEOUS ROBOTIC ENVIRONMENT

(71) Applicant: Wipro Limited, Bangalore (IN)

(72) Inventors: Sujatha Jagannath, Bangalore (IN); Ayush Raj, Bangalore (IN)

(73) Assignee: Wipro Limited, Bangalore (IN)

( * ) Notice: Subject to any disclaimer, the term of this patent is extended or adjusted under 35 U.S.C. 154(b) by 480 days.

(21) Appl. No.: 16/594,721

(22) Filed: Oct. 7, 2019

(65) Prior Publication Data
US 2021/0053221 A1   Feb. 25, 2021

(30) Foreign Application Priority Data
Aug. 19, 2019   (IN) .............................. 201941033393

(51) Int. Cl.
*G05B 19/418* (2006.01)
*B25J 9/16* (2006.01)
(Continued)

(52) U.S. Cl.
CPC ........... *B25J 9/1661* (2013.01); *B25J 9/0084* (2013.01); *B25J 9/1602* (2013.01); *B25J 9/163* (2013.01); *B25J 9/1682* (2013.01); *G06N 3/008* (2013.01); *G06N 3/04* (2013.01); *G06N 3/08* (2013.01); *G06N 3/084* (2013.01); *G06Q 10/0631* (2013.01); *G06N 3/0445* (2013.01); *G06N 3/0454* (2013.01); *G06N 3/0472* (2013.01)

(58) Field of Classification Search
CPC ...... B25J 9/1661; B25J 9/0084; B25J 9/1602; B25J 9/163; B25J 9/1682; G06N 3/008; G06N 3/04; G06N 3/08; G06N 3/084; G06N 3/0445; G06N 3/0454; G06N 3/0472; G06Q 10/0631
See application file for complete search history.

(56) References Cited

U.S. PATENT DOCUMENTS

| 7,328,196 B2 | 2/2008 | Peters, II |
| 8,793,205 B1 | 7/2014 | Fisher et al. |

(Continued)

*Primary Examiner* — Abby Y Lin
*Assistant Examiner* — Sohana Tanju Khayer
(74) *Attorney, Agent, or Firm* — Finnegan, Henderson, Farabow, Garrett & Dunner, LLP

(57) ABSTRACT

A method and system for task execution in dynamic heterogeneous robotic environment is disclosed. The method includes extracting data associated with a plurality of data categories and further deriving a plurality of factors from the extracted data. The method further includes determining a plurality of correlations among the plurality of factors based on the deep learning network. The method further includes deriving a plurality of sentiment parameters for a set of factors from the plurality of factors based on the plurality of correlations. The method may further includes simulating execution of the at least one current task by employing a plurality of robots. The method may further includes iteratively re-adjusting at least one of the plurality of sentiment parameters based on reinforcement learning performed on a result of the simulating. The method may further includes executing the at least one current task by employing the plurality of robots.

19 Claims, 12 Drawing Sheets

(51) Int. Cl.
*B25J 9/00* (2006.01)
*G06N 3/04* (2006.01)
*G06N 3/08* (2006.01)
*G06N 3/00* (2006.01)
*G06Q 10/06* (2012.01)

(56) References Cited

U.S. PATENT DOCUMENTS

| | | | |
|---|---|---|---|
| 9,579,790 B2 | 2/2017 | Laurent et al. | |
| 9,811,074 B1* | 11/2017 | Aichele | B25J 9/1656 |
| 10,800,040 B1* | 10/2020 | Beckman | B25J 9/1671 |
| 11,080,727 B1* | 8/2021 | Novak | G06N 20/00 |
| 2014/0108094 A1* | 4/2014 | Beddo | G06N 3/086 |
| | | | 705/7.31 |
| 2018/0293498 A1* | 10/2018 | Campos | G06F 8/31 |
| 2019/0228495 A1* | 7/2019 | Tremblay | B25J 9/161 |
| 2019/0251612 A1* | 8/2019 | Fang | G06T 11/00 |
| 2020/0134034 A1* | 4/2020 | Zhao | G06Q 30/0255 |
| 2020/0273013 A1* | 8/2020 | Garner | G06Q 10/087 |
| 2020/0279173 A1* | 9/2020 | Gupta | H04L 41/5022 |
| 2020/0380389 A1* | 12/2020 | Eldeeb | G06N 20/00 |

* cited by examiner

| | Date | Day | Visibility | Category | Product Character |
|---|---|---|---|---|---|
| Day | NA | 0.21/0.22 | 0.21/0.54 | 0.84/0.72 | 0.45/0/62 |
| Visibility | 0.10/0.78 | NA | 0.11/0.21 | 0.13/0.31 | 0.71/0.43 |
| Category | 0.22/0.44 | 0.43/0.90 | NA | 0.43/0.45 | 0.33/0.22 |
| Product | 0.46/0/71 | 0.76/0.24 | 0.45/0.65 | NA | 0.43/0.12 |
| Character | 0.22/0/14 | 0.89/0.12 | 0.02/0.23 | 0.11/0.19 | NA |

| Product Category | Immediate sentiment |
|---|---|
| Electronics | 5.8 |
| Cloths | 9.4 |
| Groceries | 9.0 |
| .... | .... |

602

| Product Category | Daily sentiment |
|---|---|
| Electronics | 8.2 |
| Cloths | 7.5 |
| Groceries | 5.7 |
| .... | .... |

604

| Product Category | Weekly sentiment |
|---|---|
| Electronics | 6.2 |
| Cloths | 6.4 |
| Groceries | 4.8 |
| .... | .... |

| Product Category | Monthly sentiment |
|---|---|
| Electronics | 7 |
| Cloths | 6.2 |
| Groceries | 4.1 |
| .... | .... |

608

| Cloths Sub Category | Immediate sentiment |
|---|---|
| Rainy | 9.2 |
| Summer | 7.5 |
| Winter | 3.6 |
| Women | 8.7 |
| Men | 5.6 |
| Inner wear | 6.0 |
| Trousers | 6.1 |
| .... | .... |

| Item ID | Avg processing time (past 10 occurrences) | Avg processing time (all time) | Item Category (out of 10) | .... |
|---|---|---|---|---|
| 1001 | 6.24 | 8.2 | 10 (ie one of fastest moving in warehouse) | |
| | | | 9.5 | |
| | | | 2 (rarely bought like toilet seat) | |
| .... | .... | .... | .... | |

612

| Order ID | Order Items | Date of order | Processing start | Processing finish | Bot(s) used | Other orders processed |
|---|---|---|---|---|---|---|
| O1 | 1001, 1019, 1025, 1010 | 6/08/2019 | 8:24 PM | 8:37 PM | B1 | O2, O5, O11 |
| O2 | 1000, 1001, 1004, 1019, 1020, 1025, 1009, 1030, 1031 | | 8:26 PM | 8:37 PM | B1 | O1, O5, O11 |
| .... | .... | | .... | | | |

| Bot ID | Active time (minutes) | Orders processing | Bot characteristic 1 | Bot characteristic 2 | ...... |
|---|---|---|---|---|---|
| B1 | 12 | O1, O2, O5, O11 | | | |
| B2 | 6 | | | | |
| .... | .... | .... | .... | .... | .... |

616

| Bot ID | Bot Type | Active time (minutes) | Role allotted | Bot characteristic 1 | Bot characteristic 2 | ...... |
|---|---|---|---|---|---|---|
| B1 | BT21 | 67 | R7 | | | |
| B2 | BT12 | 34 | R1 | | | |
| .... | .... | .... | | | | |

| Duration | System efficiency | Threshold efficiency | Predicted efficiency with current system |
|---|---|---|---|
| 1 hour | 8.2 | 7.5 | 7.9 |
| 1 day | 8.0 | 7.5 | 8.0 |
| .... | .... | .... | .... |

620

| Action | Current efficiency | Threshold efficiency | Max possible efficiency |
|---|---|---|---|
| Path planning | 7.5 | 5.6 | 9.2 |
| Pick up | 6.8 | 6.1 | 8.9 |
| Packaging checkout | 8.0 | 7.1 | 9.5 |
| .... | .... | .... | .... |

METHOD AND SYSTEM FOR TASK EXECUTION IN DYNAMIC HETEROGENEOUS ROBOTIC ENVIRONMENT

This application claims the benefit of Indian Patent Application Serial No. 201941033393, filed Aug. 19, 2019, which is hereby incorporated by reference in its entirety.

FIELD

This disclosure relates generally to a dynamic heterogeneous robotic environment, and more particularly to a method and system for task execution in dynamic heterogeneous robotic environment.

BACKGROUND

With an increase in e-commerce and digitally enabled customer product handling and delivery services, the amount of cargo and logistics handled across the industries, factories, and various warehouses is increasing day-by-day. Complete reliance on human involvement in handling cargo and logistics leads to difficulty. The use of robotics enabled autonomous solutions to smoothen various automated cargo and logistics handling at various places.

However, the tasks, which are typically performed by the robots, are highly limited to simple dedicated tasks, for example, material pick and place, capping bottles, etc. Based on the intended task, the conventional robots (i.e., forklifts) handling cargo and logistics are programmed to perform the intended task with different dedicated robots that may achieve any given task in a time bound manner (for example, forklifts may be deployed to pick-up all cartons in a room for storage). Thus, there are robots, which are programmed to perform a specific task, such as the forklift that can be used to only pick-up the cartons. Further, there may be other set of robots that are programmed to perform other specific tasks only by considering their unique capability and the task. For example, there are forklifts for picking and placing the cartons and another robot for extracting items out of the cartons.

Further, there are other set of conventional robots, which are efficient at performing tasks with higher capacity, while some other might be efficient at fetching or safe handling of the cargo in given circumstances. Thus, the conventional robotic solutions for handling the cargo and logistics are homogeneous and are restricted to dedicated capabilities of the robots. Hence, the intended tasks results in an un-optimized task execution, heavy resource utilization, and relies primarily on humans.

In the conventional automated task execution framework, the homogeneous robots are deployed to perform intended task. Hence, there is no mechanism to collaborate, share, or delegate the assigned task work according to the programmable capacity of various robots. Additionally, there is no mechanism for optimal task classification and robot's work allocation. Further, even though some combination of robots may lead to completion of the task in a time bound manner, it may not be possible to ensure optimal execution of tasks in dynamically varying situations. Hence, the conventional solutions cannot decide on the same combination of robots to be optimal or even sub-optimal for every task work.

In addition, the automated task execution and cargo/logistics handling consists of several drawbacks, which are determined by various factors associated with the environment in which the task is to be performed. The factors may include, but are not limited to, location, infrastructure model, climatic conditions, cargo inflow and out flow sequence, characteristics of materials, storage space, type of deployed robot's online discounts, failure rate, season, or time. In addition, the limitations and environmental constraints are not inducted to the robot's behavior learning model, which would provide collaborative opportunities for optimal task execution and resource utilization. Further, when the requirements are dynamic, the robots that are being used to handle such requirements need to be dynamic as well. Hence, inducing the required behavior in the robots is crucial and it can be considered as an assimilation of the robot's individual action sequence, characteristics, or parameters.

Further, there exist conventional systems related to enhancing robotic intelligence and enabling robots to learn new behavior and creating behavior sequences autonomously, which interacts with dynamically changing environment. Such conventional system may use sensory egosphere, which functions like a short-term memory and stores different sensor information. However, the conventional may not consider the cargo/logistics environment and robots previous behavior for planning, optimization and collaboration for the new task in hand. Further, there may be no consideration made towards task classification to improve the resource utilization, by such conventional systems.

Other conventional systems may relate to adaptive control and training of computerized devices. The learning controller apparatus in such conventional systems may be operated to determine association between a user indication and an action by an appliance. The learning apparatus may receive sensory input conveying information about a robot's state and environment (context). During operation, upon determination of the indication using sensory input, the controller may cause execution of the respective instructions in order to trigger action by the appliance. Further, in such conventional systems, a device animation methodology may enable the users to operate computerized appliances using gestures, voice commands, posture changes, and/or other customized control elements. However, the aforesaid conventional systems may not consider dynamically varying tasks at hand. Further, the aforesaid conventional systems may be limited to determining sensory information, which is static in nature. Additionally, there may not be any behavior learning performed by such systems for planning, optimization, and collaboration for the new task in hand. Further, the aforesaid conventional systems may not use deep reinforcement learning to find out the behavioral associations.

There may further be other conventional systems disclosing an apparatus and method for implementing robotic learning and evolution. Such systems relate to training robotic apparatus comprising artificial neural networks by implementing evolution within a population of robotic devices and induce modifiability in pre-programmed robotic devices. However, such conventional system may not consider dynamically varying tasks at hand and may not use the deep reinforcement learning for guiding behavior towards a new task in hand.

SUMMARY

In one embodiment, a method of task execution in dynamic heterogeneous robotic environment is disclosed. The method may include extracting data associated with a plurality of data categories in response to identifying at least one current task. The data is extracted from a plurality of data sources and each of the plurality of data categories is associated with at least one of the plurality of data sources. The method may further include deriving a plurality of factors from the extracted data based on a deep learning network. The method may further include determining a plurality of correlations among the plurality of factors based on the deep learning network. The plurality of correlations include weighted relationship between two or more factors from the plurality of factors. The method may further include deriving a plurality of sentiment parameters for a set of factors from the plurality of factors based on the plurality of correlations. The plurality of sentiment parameters are hierarchical. The method may further include simulating execution of the at least one current task by employing a plurality of robots based on each of the plurality of sentiment parameters applied to at least one associated factor from the set of factors. The method may further include iteratively re-adjusting at least one of the plurality of sentiment parameters based on reinforcement learning performed on a result of the simulating. The iterative re-adjustment is performed until each of the plurality of sentiment parameters are above a predefined threshold. The method may further include executing the at least one current task by employing the plurality of robots, based on each of the plurality of sentiment parameters applied to at least one associated factor from the set of factors in response to the iterative re-adjusting.

In another embodiment, a task execution device in dynamic heterogeneous robotic environment is disclosed. The task execution device includes a processor and a memory communicatively coupled to the processor, where the memory stores processor instructions, which, on execution, causes the processor to extract data associated with a plurality of data categories in response to identifying at least one current task, wherein the data is extracted from a plurality of data sources. Each of the plurality of data categories is associated with at least one of the plurality of data sources. The processor instructions further cause the processor to derive a plurality of factors from the extracted data based on a deep learning network. The processor instructions further cause the processor to determine a plurality of correlations among the plurality of factors based on the deep learning network, wherein the plurality of correlations include weighted relationship between two or more factors from the plurality of factors. The processor instructions further cause the processor to derive a plurality of sentiment parameters for a set of factors from the plurality of factors based on the plurality of correlations, wherein the plurality of sentiment parameters are hierarchical. The processor instructions further cause the processor to simulate execution of the at least one current task by employing a plurality of robots based on each of the plurality of sentiment parameters applied to at least one associated factor from the set of factors. The processor instructions further cause the processor to iteratively re-adjust at least one of the plurality of sentiment parameters based on reinforcement learning performed on a result of the simulating, wherein the iterative re-adjustment is performed until each of the plurality of sentiment parameters are above a predefined threshold. The processor instructions further cause the processor to execute the at least one current task by employing the plurality of robots, based on each of the plurality of sentiment parameters applied to at least one associated factor from the set of factors in response to the iterative re-adjusting.

In yet another embodiment, a non-transitory computer-readable storage medium is disclosed. The non-transitory computer-readable storage medium has instructions stored thereon, a set of computer-executable instructions causing a computer comprising one or more processors to perform operations that include extracting data associated with a plurality of data categories in response to identifying at least one current task, wherein the data is extracted from a plurality of data sources. Each of the plurality of data categories is associated with at least one of the plurality of data sources. The operations further include deriving a plurality of factors from the extracted data based on a deep learning network. The operations further include determining a plurality of correlations among the plurality of factors based on the deep learning network, wherein the plurality of correlations comprise weighted relationship between two or more factors from the plurality of factors; deriving a plurality of sentiment parameters for a set of factors from the plurality of factors based on the plurality of correlations, wherein the plurality of sentiment parameters are hierarchical. The operations further include simulating execution of the at least one current task by employing a plurality of robots based on each of the plurality of sentiment parameters applied to at least one associated factor from the set of factors; iteratively re-adjusting at least one of the plurality of sentiment parameters, based on reinforcement learning performed on a result of the simulating, wherein the iterative re-adjustment is performed until each of the plurality of sentiment parameters are above a predefined threshold. The operations further include executing the at least one current task by employing the plurality of robots, based on each of the plurality of sentiment parameters applied to at least one associated factor from the set of factors in response to the iterative re-adjusting.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 6A-6E illustrate a set of tables depicting sentiment parameters derived based on data captured in a warehouse robotic environment, in accordance with an exemplary embodiment.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims. Additional illustrative embodiments are listed below.

Figure 1:
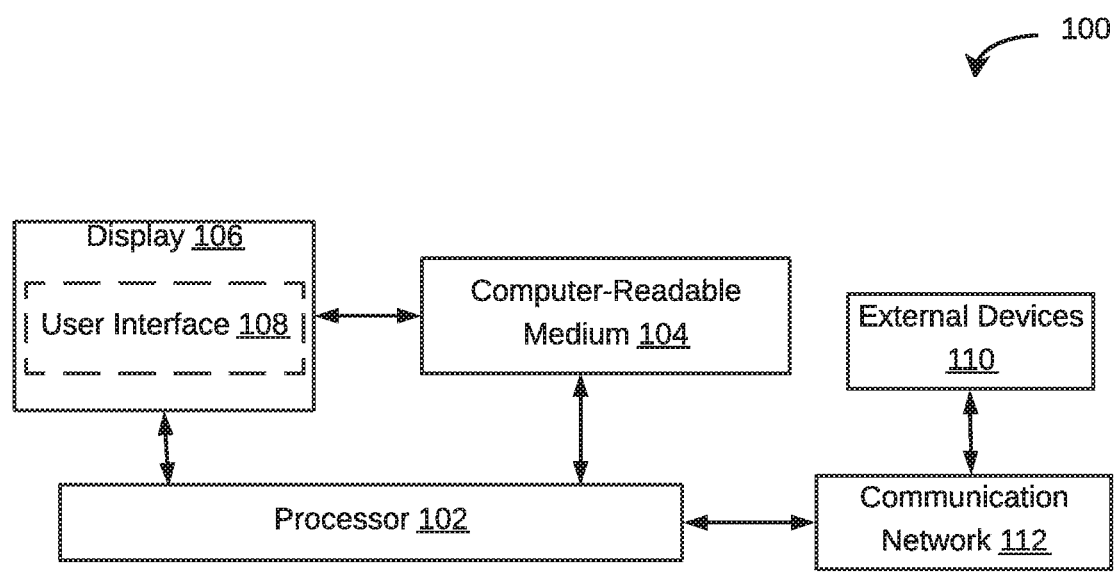
FIG. 1 is a block diagram of a system for task execution in dynamic heterogeneous robotic environment, in accordance with an embodiment.

Referring now to FIG. 1, a block diagram of a system 100 for task execution in dynamic heterogeneous robotic environment is illustrated, in accordance with an embodiment. As will be appreciated, the system 100 may be implemented in a task execution device (not shown in FIG. 1). Examples of the task execution device may include, but are not limited to a server, a desktop, a laptop, a notebook, a netbook, a tablet, a smartphone, a mobile phone, or any other computing device.

As will be described in greater detail in conjunction with FIG. 2 to FIG. 8, the task execution device may extract data associated with a plurality of data categories in response to identifying one or more current tasks. The data may be extracted from a plurality of data sources. Further, the task execution device may derive a plurality of factors from the extracted data based on a deep learning network. Further, the task execution device may determine a plurality of correlations among the plurality of factors based on the deep learning network. The plurality of correlations include weighted relationship between two or more factors from the plurality of factors. Further, the task execution device may derive a plurality of sentiment parameters for a set of factors from the plurality of factors based on the plurality of correlations. The plurality of sentiment parameters may be hierarchical.

Further, the task execution device may simulate execution of the one or more current tasks by employing a plurality of robots based on each of the plurality of sentiment parameters applied to one or more associated factors from the set of factors. Further, the task execution device may iteratively re-adjust one or more of the plurality of sentiment parameters based on reinforcement learning performed on a result of the simulating. The iterative re-adjustment may be performed until each of the plurality of sentiment parameters are above a predefined threshold. Further, the task execution device may execute the one or more current tasks by employing the plurality of robots, based on each of the plurality of sentiment parameters applied to one or more associated factors from the set of factors, in response to the iterative re-adjusting.

The system 100 may include a processor 102, a computer-readable storage medium 104 (for example, a memory), and a display 106. The computer-readable storage medium 104 may store instructions that, when executed by the processor 102, may cause the processor 102 to execute task in dynamic heterogeneous robotic environment. The computer-readable storage medium 104 may also store various data (for example, data, plurality of data categories, plurality of factors, plurality of correlations, plurality of sentiment parameters, predefined threshold, environmental factors database, historical database, numerical value, and the like) that may be captured, processed, and/or required by the system 100. The system 100 may interact with a user via a user interface 108 accessible via the display 106. The system 100 may also interact with one or more of external devices 110 over a communication network 112 for sending or receiving various data. The external devices 110 may include, but are not limited to a remote server, a digital device, or another computing system. The system 100 may also be adapted to exchange data with other components or service providers using the communication network 112, for example, Wide Area Network (WAN) or the Internet.

Figure 2:
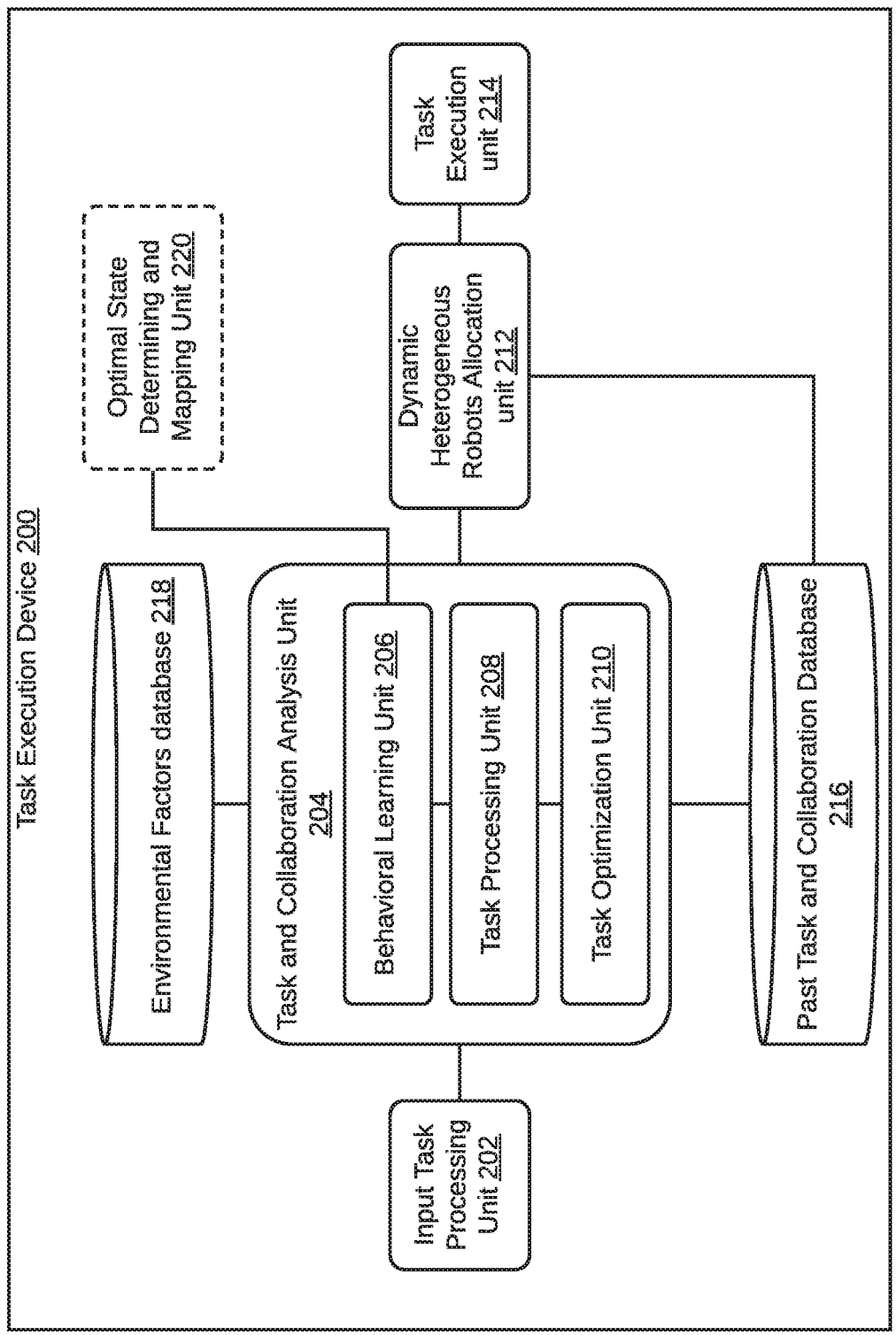
FIG. 2 illustrates a block diagram of an internal architecture of a task execution device that is configured to execute task in dynamic heterogeneous robotic environment, in accordance with an embodiment.

Referring now to FIG. 2, a block diagram of an internal architecture of a task execution device 200 that is configured to execute tasks in a dynamic heterogeneous robotic environment is illustrated, in accordance with an embodiment. The task execution device 200 may include an input task processing unit 202 and a task and collaboration analysis unit 204. The task and collaboration analysis unit 204 may further include a behavioral learning unit 206, a task processing unit 208, and a task optimization unit 210. Additionally, the task execution device 200 may include a dynamic heterogeneous robot allocation unit 212, a task execution unit 214, and a past task and collaboration database 216. As will be appreciated by those skilled in the art, all such aforementioned units 202-216 may be represented as a single unit or a combination of different units. Moreover, as will be appreciated by those skilled in the art, each of the units 202-216 may reside, in whole or in parts, on one device or in multiple devices in communication with each other.

The input task processing unit 202 may provide information regarding a task (that needs to be executed) to the task and collaboration analysis unit 204. The input task processing unit 202 may include an Application Programming Interface (API), for example, a warehouse floor Graphical User Interface (GUI), a mobile application, a connection to database, or the like. The input task processing unit 202 may receive the task, which may be provided by different levels of multiple discrete hierarchies, from at least one of a production chain of warehouse, a factory floor, an industry, and/or the like. Moreover, the input task processing unit 202 may be configured to convert received information to more specific goals. By way of an example, in an engine factory gradual decrease in overall demand may lead to a gradual reduction in speed of operations of all autonomous functions or may result in shutting down a few tasks performed by the engine factory.

Moreover, the input task processing unit 202 may be responsible for collecting and cleaning information of the task, when the received information of the task may be present in raw and unprocessed format. Hence, the input task processing unit 202 may receive information of the task from various sources and further convert information into a usable format. By way of an example, the input task processing unit 202 may classify a warehouse order information based on time, date, location, season, or the like and may further use for different purposes.

The task and collaboration analysis unit 204 may be configured to receive data from each of the input task processing unit 202, an environmental factors database 218, and the past task and collaboration database 216. Further, the task and collaboration analysis unit 204 may pass a computed collaboration model information to the dynamic heterogeneous robot allocation unit 212 for implementation. The task and collaboration analysis of data may be executed using the behavioral learning unit 206, the task processing unit 208, and the task optimization unit 210.

The environmental factors database 218 may deal with one or more local and non-local changes in an environment, which may have potential to affect changes in the robot's collaboration. The external factors may include, but are not limited to, current climate of a given location (for example, climate of a city or a locale), online platform offers, seasonal demand of products, festive sales, consumer sentiment, new product launches, or the like. Additionally, the internal factors may include conveyor belt arrangement, number of Autonomous Ground Vehicles (AGVs), which can move autonomously based on instructions of indoor environment, arrangement of warehouse, limiting factor in flow of execution of goals, area where billing or hand-off to next stage happens, warehouse setup, or the like.

The behavioral learning unit 206 may identify characteristics and predefined capability of the robot to achieve goal of the task in dynamic heterogeneous robotic environment such as warehouse, factory, industry, or the like. Moreover, the behavioral learning unit 206 may identify specific behavior of the robot in accordance to the need of the system 100 and specific decisions about the functioning, which may take place in the dynamic heterogeneous robot allocation unit 212. It should be noted that the behavior learning unit 206 may work in parallel with an optimal state determining and mapping unit 220.

The task processing unit 208 may be configured to process computation intensive part of the task execution. The computation intensive part may include training and learning of the Artificial Neural Network (ANN). Moreover, the task processing unit 208 may include information accumulated from the behavioral learning unit 206 and may further pass this information to the task optimization unit 210 for further processing. It should be noted that the task processing unit 208 may include a separate database to store various information.

The task optimization unit 210 may be configured to receive information of the task from the task processing unit 208. Further, based on the received information, the task optimization unit 210 may determine an optimal state of the task, which may be composed of smaller actions. In the optimal stage, the task optimization unit 210 may optimize an analyzed pattern of the task that may have been detected as a result, in the task processing unit 208. Further, the task optimization unit 210 may help in realizing the analyzed pattern, using deep learning mechanism, in terms of reward, data, behavior, characteristics, and/or the like. It should be noted that the task optimization unit 210 may function in parallel with respect to each of the behavioral learning unit 206 and the task processing unit 208.

The dynamic heterogeneous robot allocation unit 212 may be configured to receive the analyzed pattern and process, which may be optimized in the task optimization unit 210. Further, the dynamic heterogeneous robot allocation unit 212 may map the task to the pattern and process received from the task optimization unit 210. Additionally, the dynamic heterogeneous robot allocation unit 212 may identify a plurality of actions that are required to be performed by the robot. Further, the dynamic heterogeneous robot allocation unit 212 may determine features that are required to be acquired by the robot in order to perform the plurality of actions. It should be noted that parameters of features associated with the robot may be adjusted based on the requirement of the task. For example, based on the requirement, speed of the AGV or number of bins of the AGV may be adjusted.

The task execution unit 214 may be configured to incorporate real time execution of the tasks. The task execution unit 214 may allow the tasks to be executed by single or multiple robots, based on a schedule mechanism. The schedule mechanism may be determined using priority list, effect of collaboration, deep learning framework, low cost for completion of goals, and the like. It should be noted that the task execution unit 214 may directly access the past task and collaboration database 216, which may store information associated with the task.

The task execution device 200 may deal with high level functioning and execution of the task in a larger picture. Moreover, the task execution device 200 may use information of sub-tasks that may already be present. By way of an example, in a retail warehouse scenario, the AGV may be useless without a fundamental information on how to localize the AGV in the map for subsequent travel. Hence, the fundamental information is required to ensure optimal fulfillment of a longer line of tasks. As an example, when 15 orders are received and each order is executed by different AGVs, then a variety of factors including battery level, robot efficiency, robot area of operation, robot already executing orders, or the like may be used to determine an AGV to which the order needs to be assigned. Once assigned, the AGV may calculate its new path and may undertake the order completion. The crucial sub-tasks may include information like traveling from one point to another for the AGV, or information on how to cut metal in a straight line by a sheet metal cutting machine. Once the tasks orders or goals are executed, the information may be sent back for association to the dynamic heterogeneous robot allocation unit 212, which may store the information in a specified format in a historical database (for example, the past task and collaboration database 216) for further analysis.

Once the optimal state determining and mapping unit 220 manages to determine optimal patterns for the system 100, the actors or workers act on it. The optimal state determining and mapping unit 220 may include robots or factory robots or conveyor belts or the like, which may be working in real time to reach the dynamic objectives. The optimal state determining and mapping unit 220 may have direct link with the historical database to update efficiency scores of executed tasks for future use.

The modules within the task execution device 200 may be connected using wireless or wired communication protocols, which may include, but are not limited to Serial Advanced Technology Attachment (SATA), Integrated Drive Electronics (IDE), IEEE-1394, Universal Serial Bus (USB), fiber channel, Small Computer Systems Interface (SCSI), Simple To Design (STD) Bus, Recommended Standard (RS)-232, RS-422, RS-485, I2C, Serial Peripheral Interface (SPI), Microwire, 1-Wire, IEEE 1284, Intel Quick Path Interconnect, InfiniBand, or Peripheral Component Interconnect Express (PCIe) etc.

Figure 3:
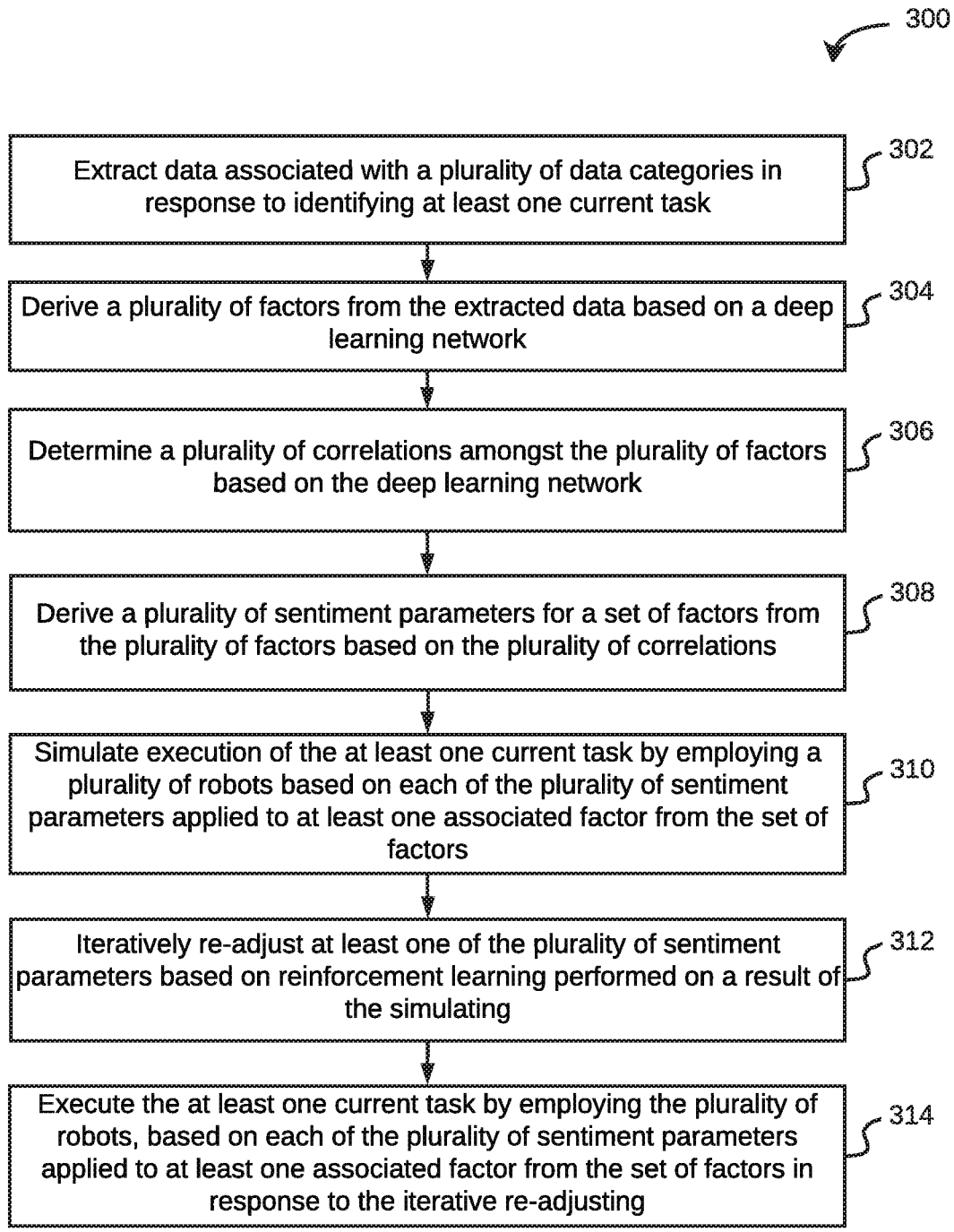
FIG. 3 illustrates a flowchart of a method for task execution in dynamic heterogeneous robotic environment, in accordance with an embodiment.

Referring now to FIG. 3, a flowchart of a method 300 for task execution in dynamic heterogeneous robotic environment is illustrated, in accordance with an embodiment. Elements of FIG. 3 have been explained in conjunction with those of FIGS. 1 and 2.

At step 302, the task execution device 200 may extract data associated with a plurality of data categories in response to identifying at least one current task. The task execution device 200 may extract data from a user through an application and may further store the data in a database. The task execution device 200 may receive a real-time order, which may be representative of a current task. The task execution device 200 may also receive inputs from a supply chain, which may be fed manually and/or automatically. Other form of stimulus may also be received that may lead to creation of one or more tasks. Tasks may be allotted to a warehouse or factory (in which tasks are being executed) through an external system. Such tasks may be received continuously over time. The task execution device 200 may create an efficient system, which may churn out the optimal task completion using robots which may perform basic operations. It should be noted that the data may be extracted from a plurality of data sources, which may include the environmental factors database 218 and a historical database (for example, the past task and collaboration database 216). The historical database may further include at least one of order information, factory functioning information, external information, robot history information, task handling information, or the like. Each of the plurality of data categories are associated with one of the plurality of data sources. In other words, data extracted from the environmental factors database 218 may be associated with an environment data category and data extracted from the historical database may be associated with a historic data category.

By way of an example, a given order may be received at time slot 7:45 PM in a warehouse system that processes orders continuously. Further, the task execution device 200 may fetch predicted type of orders for a predictive cycle of 8 PM to 9 PM for the current day. Hence, the given order, which may be fetched by the task execution device 200 in the predictive cycle of 8 PM to 9 PM, may not be an exact order but an estimate of which order patterns may be relevant. These order patterns may be obtained through a deep learning network. This has been explained in detail in the description below. As the task list keeps on decreasing, the task execution device 200 calculates an efficiency score. When the efficiency score falls below the predefined threshold, the task execution device 200 may re-calibrate the deep learning network in order to take into account an error obtained in current iteration of the deep learning network. However, during the duration of re-calibration of the deep learning network, tasks may keep coming and these tasks may be executed using a current non-optimal setup (i.e., without re-calibration of the deep learning network).

Further at step 304, the task execution device 200 may derive a plurality of factors from the extracted data based on the deep learning network. The plurality of factors may be fetched from different databases that may include, but are not limited to, a product order information, a factory functioning information, an external information, a robot history information, a task handling information through statistical analysis for training and learning purpose, and the like. The robot history information may further include, but is not limited to, information on task execution timing, bot travel history, average time taken for individual actions, which are the constituents of task, average travel speed, average pick speed for different category of items (for example, picking up chips might take more time than bottles), bot behavior code, and the like.

Once the plurality of parameters have been fetched, one or more characteristics of the plurality of factors may be matched using statistical methods, which may include, but are not limited to, regression, normalization, estimation and confidence values, model accuracy, and the like. The plurality of factors may be updated in the task execution device 200. The plurality of factors may include at least one of a date, a day, a time, product visibility, a product character, a product category, or the like and each of the plurality of factors may represent a neuron in the deep learning network.

Based on the deep learning network, at step 306, the task execution device 200 may determine a plurality of correlations among the plurality of factors. The task execution device 200 may determine the plurality of correlations among the plurality of factors based on matching patterns. The plurality of correlations may include weighted relationship between two or more factors from the plurality of factors. When matching of the pattern is below a predefined threshold, then the task execution device 200 may re-calibrate the plurality of factors and the database may be updated after every iteration of the re-calibration. It should be noted that the pattern matching of the plurality of factors, which may influence the automated task execution, may be processed using the deep learning network. Additionally, connections or patterns between tasks, rewards and robot's details may also be processed by using deep learning network. This may also influence the automated task execution. It will be apparent to a person skilled in the art that the structure of a robot collaborating network and the number or quality of inputs in the robot collaborating network may vary on a case-to-case basis. This is further explained in detail in conjunction with the FIGS. 4A and 4B.

Further at step 308, the task execution device 200 may derive a plurality of sentiment parameters for a set of factors from the plurality of factors based on the plurality of correlations. It should be noted that each of the plurality of sentiment parameters may be represented by a numerical value and the plurality of sentiment parameters may be hierarchical. The hierarchy associated with the sentiment parameter in the plurality of sentiment parameters corresponds to at least one of roles, task allocation to the plurality of robots, robot functioning, or product categories. The derivation of the plurality of sentiment parameters is further explained in detail in FIGS. 6A-6E.

Further at step 310, the task execution device 200 may simulate execution of the at least one current task by employing a plurality of robots based on each of the plurality of sentiment parameters applied to at least one associated factor from the set of factors. The task execution device 200 may determine characteristics of the plurality of robots based on a reward point for an optimized collaboration to implement the task. The optimal collaboration may be selected from the previously computed simulation patterns in the reinforcement learning simulation. Further, the task execution device 200 may map characteristics of the optimal collaboration to the available combination of the plurality of robots.

Each of the task may include a plurality of actions. Based on complexity of an action, the action may be considered as a task and may further be divided into sub-actions. The tasks may range from optimizing a warehouse to optimizing specific movements, for example, cutting metal sheets. In an embodiment, tags may be assigned to a current set of orders (for example, 9 pm may be declared as a rush hour in a warehouse and an order received during this time may be tagged as a rush hour order). The robot behavior association may be finished and the best possible combination may be deployed for executing the current objectives, tasks, or orders. The sub tasks may be allotted to the robots based on associations and based on tasks that need to be performed by the robots.

By way of an example, according to predictive analysis, dispatch of 120-150 items from clothes section may be expected in the next 90 minutes. Further, based on simulation, in the regression model, 2 maximas in gradient may descend. A first maxima may be at 4 robots, while the second maxima may be at 5 robots. Processing of cloth items may be assigned a priority level of 4. Thus, in order to save resources, the task execution device 200 may allocate 4 robots instead of 5 robots to process the corresponding task.

Hence, when compared to the items having priority level 1 (for example, grocery), the task execution device 200 may generate negative rewards to a lesser extent when the cloth items are delivered late for the aforesaid items having priority level 4.

Further at step 312, the task execution device 200 may iteratively re-adjust at least one of the plurality of sentiment parameters based on reinforcement learning performed on a result obtained after simulating execution of the at least one current task. The iterative re-adjustment may be performed until each of the plurality of sentiment parameters are above a predefined threshold. Further at step 314, the task execution device 200 may execute the at least one current task by employing the plurality of robots, based on each of the plurality of sentiment parameters applied to at least one associated factor from the set of factors in response to the iterative re-adjusting. In an embodiment, an action agent may execute the orders or tasks and relevant information generated based on the execution may be stored in the past task and collaboration database 216 with appropriate structures.

Figures 4A, 4B:
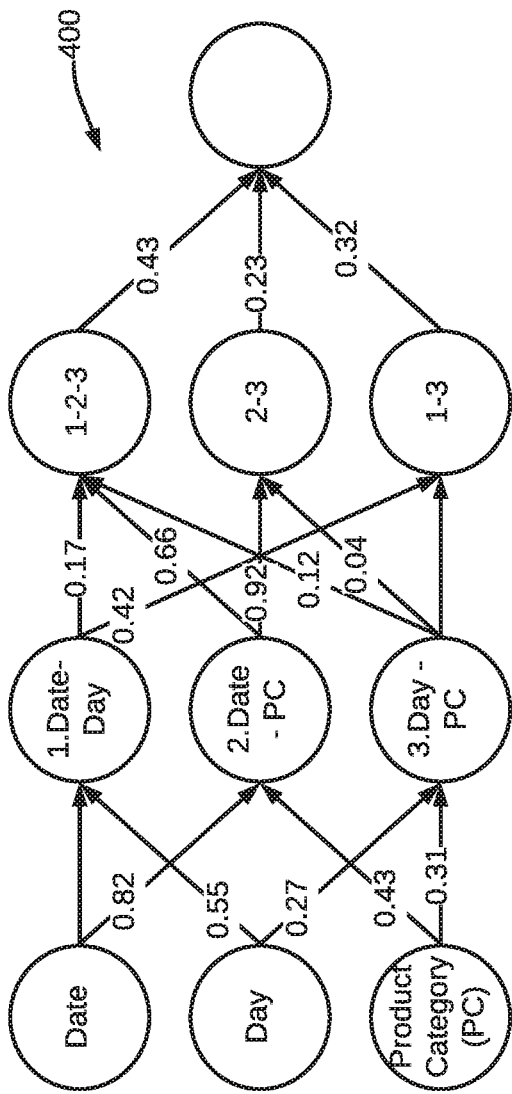
FIGS. 4A and 4B illustrate a deep learning network and corresponding data in tabular form for identifying the plurality of correlations among the plurality of factors, in accordance with an exemplary embodiment.

Referring now to FIGS. 4A and 4B, a deep learning network 400 and corresponding data in tabular form for identifying a plurality of correlations among a plurality of factors is illustrated, in accordance with an exemplary embodiment. The deep learning network 400 may include the plurality of factors that the task execution device 200 may consider in order to predict the tasks for next given time frame. The deep learning network 400 may then re-calibrate the plurality of factors accordingly. By way of an example, a weight may lie between 0 to 1 and the plurality of factors may be Date, Day, Time, Visibility, ProductCharacter1, ProductCharacter2, Category1, Category2, and the like. The correlation between: Date-Time is 0.2-0.31, Day-Time is 0.56-0.2, Date-Visibility is 0.21-0.54, Category1-Day is 0.11-0.02, or the like.

The correlation of the plurality of factors may be stored in a table as depicted in FIG. 4B. By way of an example, if we consider "0.43/0.90," 0.43 may represent the weight of 'visibility' and corresponding significance in relation with 'day', whereas "0.90" may represent weight of 'day' and corresponding significance in relation with 'visibility.' The task execution device 200 may back propagate the error to adjust the weights until the task execution device 200 may start providing an appropriate output. In the deep learning network, the weight of each of the plurality of factors may be reduced or increased based on the required output. In another embodiment, the task execution device 200 may identify correlation among three factors of the plurality of factors. Further, weights may be adjusted iteratively in accordance with gradient descend using a deep neural network (for example, recursive Boltzmann network) with back propagation.

Figure 5:
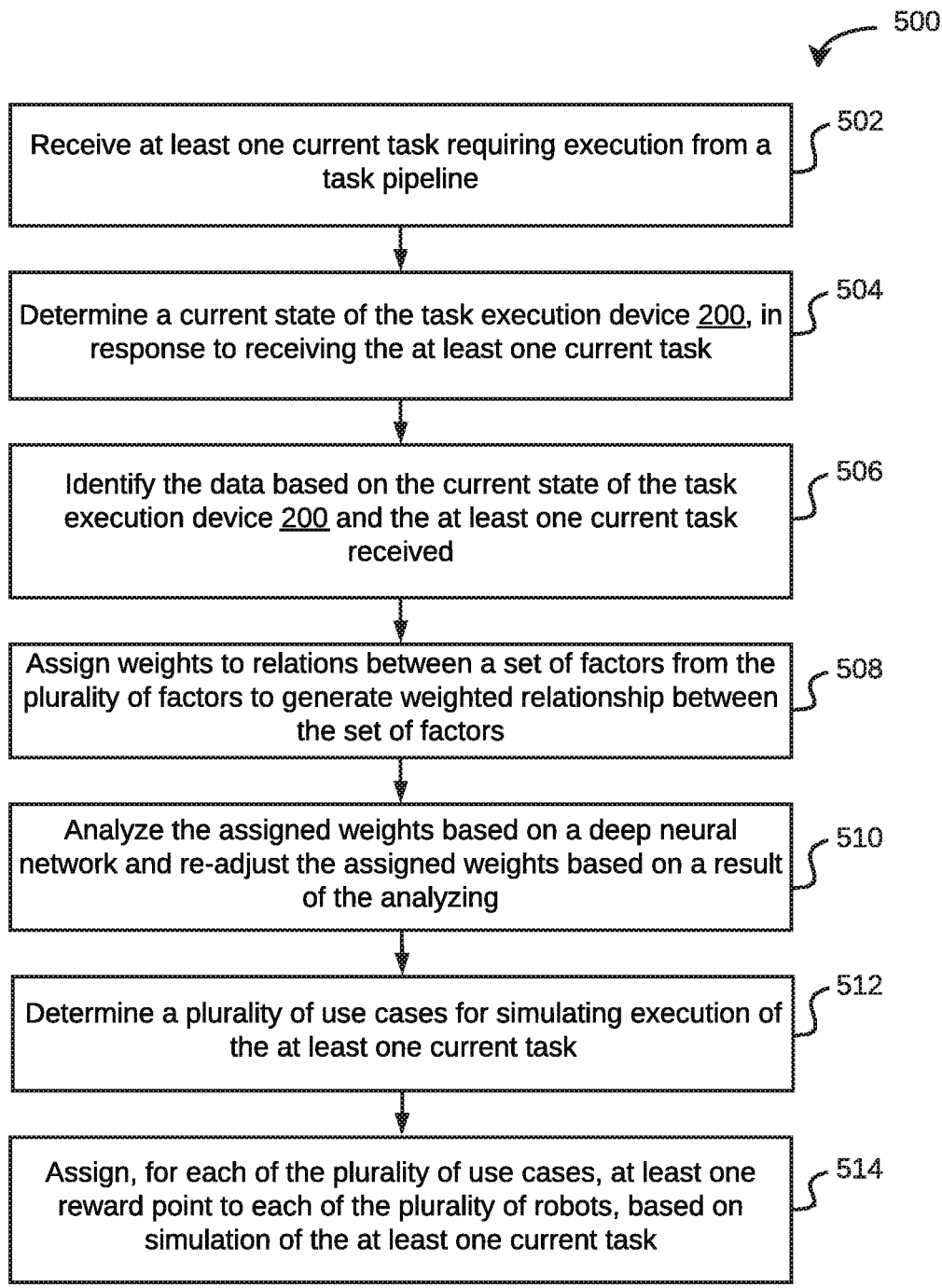
FIG. 5 illustrates a flow diagram of detailed method for task execution in dynamic heterogeneous robotic environment, in accordance with an embodiment.

Referring now to FIG. 5, a flowchart of a detailed method 500 for task execution in dynamic heterogeneous robotic environment is illustrated, in accordance with an embodiment. At step 502, the task execution device 200 may receive the at least one current task requiring execution, from a task pipeline. The at least one current task may be extracted from the task pipeline for execution and may include only a final task from request list received from a system (for example, a cargo-logistics handling and automation system). The at least one current task may not require any further pre-processing, however the current task may be required to be split into various sub-tasks. The current task, for example, may include, but is not limited to, fetching 15 products in a warehouse, assembling 10 cars, enhancing throughput for all the orders in the warehouse on a festive day, or the like.

Further at step 504, the task execution device 200 may determine a current state of the task execution device 200, in response to receiving the at least one current task. At step 506, the task execution device 200 may identify the data based on the current state of the task execution device 200 and the at least one current task received.

At step 508, the task execution device 200 may assign weights to relations between a set of factors from the plurality of factors to generate weighted relationships between the set of factors. The task execution device 200 may use the data and a deep learning network to include approximate good states for the task simulation. The state may be populated based on a previous order history stored in the database. Further in the ANN, the set of factors may be compared with the previous order history. When the ANN may identify that matching may be above the predefined threshold, the previous order history configurations may be borrowed. However, when matching is below the predefined threshold, the set of factors of similar or nearby state may be carried forward. Further, the weights of the set of factors may be adjusted in the next simulation learning steps to generate a required output.

At step 510, the task execution device 200 may analyze the assigned weights based on a deep neural network (for example, a Recursive Boltzmann network) and may later re-adjust the assigned weights based on a result of the analyzing. It will be apparent to a person skilled in the art that the Recursive Boltzmann network may be one of the ways to constitute core of the deep learning network. The task execution device 200 may include an auto-encoder that may be used for dimensionality reduction. Additionally, the task execution device 200 may match the set of factors to the previous order history based on a statistical method (for example, regression analysis). Within this statistical method, a statistical error function may be used for predicting optimal patterns in the set of factors. The inter-dependency on several use cases may be depicted as multivariate regression, which may be solved using inbuilt mathematical libraries.

At step 512, the task execution device 200 may determine a plurality of use cases for simulating execution of the at least one current task. Each of the plurality of use cases may include application of each of the plurality of sentiment parameters to at least one associated factor from the set of factors. The simulations of the robot collaboration towards the task execution may be virtually created to check an optimal configuration. In simulation, feasibility of the collaboration network may be created with respect to generated rewards in order to decide the optimal configuration for the collaboration network. Additionally, the set of factors associated with each of the at least one task, corresponding robots, and external factors may continuously be changed in each simulation execution.

Further, simulation test cases may vary and may have different set of factors in each simulation. However, the simulation may carry guidance of pattern and optimal setup forward from previous similar executions to achieve random simulations in several combinations. Further, the task execution device 200 may learn and update one or more rule for incoming task optimization based on several combinations and deep reinforcement learning. The rules, for example, may include basic parameter or factors, which may govern how a robot may drift while traversing corners within a warehouse in the shortest possible time duration. By way of another example, the rules may combine more than one factors, such that, for optimized execution of a task, time of day, discount, category, and current robot charge may be considered and integrated.

For each of the plurality of use cases, the task execution device 200, at step 514, may assign at least one reward point to each of the plurality of robots, based on simulation of execution of the at least one current task. Reward points may be assigned based on a reward function, which may be central to the reinforcement learning. The reward function may be used in multiple combinations of positive, negative, exponential, degrading, or the like to match a situation. Based on a use case that is situational, the task execution device 200 may include a provision for larger sparse and continuous reward points in the reinforcement learning. By way of an example, the task of an item pickup may be considered as semi-sparse positive reward and completing the item pickup may be considered as a positive reward. By way of another example, setting an objective to the robot for an item pickup and closing in on the item may be considered as a continuous positive reward.

The task execution device 200 may assign negative awards, which may be used to fine-tune required behavior of robots towards optimization of a current task. Negative rewards may also have preset threshold based on carrying capacity of a robot, speed of a robot, or the like. By way of an example, having such a preset threshold may highly reward the robot, when the robot is overloaded beyond previous task specific capacity of the robot. In certain cases, large negative rewards awarded to a robot may exceed beyond the negative rewards awarded in the previous task. This may happen only when an equally large number of positive rewards may be awarded during the current task. In this case, there may be a continuous negative reward with passing time to make sure that the task execution device 200 may achieve the goal of minimizing the allotted time. It should be noted that the continuous negative rewards may be assigned only for those tasks, which may be associated with already detected optimized pattern of previous tasks.

Referring now to FIGS. 6A-6E, a set of tables depicting sentiment parameters derived based on data captured in a warehouse robotic environment is illustrated, in accordance with an exemplary embodiment. This exemplary embodiment considers a 25,000 square feet single floor warehouse with different sections storing different category of items. There may be a separate section for cold items, cloths, groceries, and the like. The warehouse may have several aisles, which may consist of racks. Each rack may have horizontal shelves and vertical columns on which the items or products may be stored.

The warehouse may include an automated system and robots for performing certain user-defined tasks. The robots may be classified into four categories: fast speed land robots for carrying the items, heavy capacity land robots for carrying the items, super-fast flying drones for carrying the items, and forklifts for large scale transportation. Each of the robots may have bins to carry multiple items. Additionally, the robots may have a plurality of parameters (for example, speed, ideal carrying weight, or the like), which can be manipulated by a central system. The automated system may include an intelligent conveyor belt for sorting group of items, collecting items, and sending items to last mile delivery agents. Additionally, there may be a second automated system, which may include a box slider and packager for packing all the items in one order.

Further, the automated system may receive data, for example, the external environment data, the internal environment data, and internal category data. The automated system may receive the external environment data from an open source Application Programming Interface (API). For example, open source weather information websites (OPENWEATHERMAP™, APIXU™, and the like) may be used to receive the external environment data. Hence, the external environment data may be: weather—rainy season, temperature—min: 25 C to max 34 C and cloudy with slight showers, forecast information—rainy for 1 week, day—Sunday, date—4th august 2019, festival—not Applicable. Moreover, the automated system may receive internal environment data, which may include: structure of racks and shelves marked in .pgm and .yaml format files. A Simultaneous Localization And Mapping (SLAM) technique may be deployed for guiding the AGVs, the packaging counters, checkout counters, conveyor belts, or robot charging stations marked on the map.

The internal category data may include units sold in given category versus maximum units sold in any category; units sold in given time block versus maximum units sold over a time duration; total online checks versus maximum online check for any given category; and discount and visibility versus maximum discount. The internal category data may be obtained from the past task and collaboration database 216.

Further, based on the correlations found between the set of factors, patterns may be deduced and further used to arrive at the plurality of sentiment parameters for different relevant categories. The plurality of sentiment parameters may continuously change as data flows in and out of the automated system. Additionally, the plurality of sentiment parameters based on product or factor may be determined by merging other sentiments. By way of am example, the plurality of sentiment parameters related to product centered section may be represented based on sample equation proportionality. Some sample equation proportionality are depicted by way of equations 1 to 4:

$$\text{sentiment} \propto \text{sales in past hour} \quad (1)$$

$$\text{sentiment} \propto \text{pending items in queue} \quad (2)$$

$$\text{sentiment} \propto \text{number of visits to item in past hour} \quad (3)$$

$$\text{sentiment} \propto \text{category of good} \quad (4)$$

A table 602 represents values of immediate sentiment parameter associated with different product categories. The values for all sentiment parameters are derived from a scale of 1 to 10. For example, the value of the immediate sentiment parameter associated with electronic products is 5.8 and the value of the immediate sentiment parameter associated with cloth is 9.4. Further, a table 604 represents values of daily sentiment parameters associated with different product categories. For example, the value of daily sentiment parameter associated with electronics product is 8.2 and the value of daily sentiment associated with cloth is 7.5. In a similar manner, a table 606 represent values of weekly sentiment parameters associated with different product categories. For example, the value of weekly sentiment parameter associated with electronics product is 6.2 and the value of weekly sentiment parameter associated with cloth is 6.4. Further, a table 608 represents value of monthly sentiment parameters associated with different product categories. For example, the value of the monthly sentiment parameter associated with electronics product is 7 and the value of monthly sentiment parameter associated with cloth is 6.2.

Based on the tables 602, 604, 606, and 608, it may be determined that sale of groceries depends mostly on the time of the day. The plurality of sentiment parameters may be decided after reinforcement learning based on consecutive simulations. By way of an example, value of a sentiment parameter for the rainy cloth may not be high, even if it is a rainy day. The value of a sentiment parameter may depend on the empirical data, which may include non-seasonal rain, end of season without discount, or the like.

A table 610 represents values of immediate sentiment parameters associated with each sub categories of cloth. For example, the value of the immediate sentiment parameter associated with rainy cloth is 9.2 and the value of the immediate sentiment parameter associated with summer cloth is 7.5. Similarly, the automated system may determine values of sentiment parameters of each sub-category of cloth in hourly, daily, weekly, and monthly basis. Based on the table 610, it is evident that summer cloths are discounted, hence the value of the consumer sentiment parameter is 7.5 and as it is raining outside, the value of sentiment parameter for items associated with rainy items is 9.2.

The values for various sentiment parameters may be derived based on data represented by tables 612 to 622. The table 612 may include information about order and sales. The tables 602-610 may include similar information that may be determined based on a user's perspective. For example, a user's sentiment associated with different products may be stored. In the table 612, the automated system may analyze internal functioning of the warehouse. For example, for the item identification number 1001, average processing time of past 10 occurrences is 6.24, average processing time of all time is 8.2, and the item category is 10. The table 612 may help to determine the average processing time for items at an individual level, even though items may be bought together in bulk.

The table 614 may include details of each order in the warehouse. For example, for a particular order identification number O1: order items are 1001, 1019, 1025, and 1010; date of the order is Jun. 19, 2008; time of starting of the process is 8:24 PM; time of ending of the process is 8:37 PM; robot used for the order is B1; and other the orders processed are O2, O5, and O11.

The statistics given in the tables 602-614 may be used in reinforcement learning and weights may continuously change in the deep learning as well as in reinforcement learning. It should be noted that reinforcement learning may also select relevant data-set to run simulations. For example, in festive season, sales of traditional attire may drastically go up. In this case, the automated system may prefer training on historical data of last year than weekly trends. Similarly, weighs may also be adjusted to obtain predicted rate of purchase.

Similarly, individual tables may also be represented for yearly time based classification, brand based classification, utility based classification, or the like. It should be noted that, immediate rate of purchase (7.5/10) may represent rate of purchase in the warehouse at that moment. This may be deduced statistically and may contribute to the overall sentiment. Additionally, day rate of purchase: (6/10) may represent the comparison between the rate of purchase in the day and the predicted rate of purchase.

The table 616 may include details associated with each robot. The characteristics of the robot may include, but are not limited to, the bot speed, degree of freedom, type of robot, battery capacity, load capacity, best suited purpose, capacity of performing tasks, and the like. Each robot may have a fixed list of tasks to perform based on physical capability. The robots may be allotted for different tasks based on their respective capabilities and the current requirements. The drones may also be a part of the automated system; hence the task may be allotted to the AVGs automatically based on simulation. These changes in the use cases or places where different category of robots may be used for difference tasks leads to collaboration or synergy between the robots.

The table 618 may include details of the task allotted to each robot in the warehouse. For example, R7 may be the role allotted to the robot having robot identification number B1 and robot type BT21 for moving shelves from one location to another location. In a similar manner, R1 may be the role of moving cartons to shelves by the robot having robot identification number B2 and robot type BT12. Hence, the automated system may have allotted the tasks R1 and R7 to the robots B1 and B2 respectively, as the automated system needs robots, which are physically capable of completing the tasks R1 and R7.

The table 620 may include details of sub-level efficiency of the automated system. For example, within a duration of one hour, system efficiency may be 8.2, threshold efficiency may be 7.5, and predicted efficiency with current system may be 7.9. The predicted efficiency may be estimated as reward points for the automated system. Additionally, the system efficiency may be the actual reward points obtained by the automated system after the tasks may be executed and used for accuracy confidence of future task executions. It should be noted that the automated system may re-calibrate when the system efficiency may be below 7.5. The automated system may process a task based on descending order of the level of task. Hence, the higher level task (for example, completion of an order X1) may be executed before lower level task (for example, pick item 1, 2 and 5 from one place to another place).

Based on the system efficiency, the automated system may re-calibrate by checking updated database of orders; retraining the pattern and trend system; re-simulating the reinforcement learning unit and gain optimal configurations with special attention to patterns in more recent orders leading to degradation in efficiency; applying new optimal configurations to a warehouse in accordance with incoming time setup; and setting-up the new parameters and configurations for the robots.

The table 622 may include efficiency of the sub-tasks. The automated system may deal with relatively larger tasks possibly consisting of several sub-tasks. Hence, the automated system may not go into depth of the path planning but it may take it as a black box. When overall efficiency of the automated system drops below the threshold, the automated system may further sub-divide the tasks to increase efficiency. Further, similar tables for the plurality of parameters (for example, time taken by the robots for individual activity, safety while handling the items, or the like) may be generated to determine the final efficiency scores mentioned.

By way of an example of a short simulation, optimization parameters may be time and energy, and patterns or trends imported from the deep learning network may be P1 . . . P100. The sample pattern P1 may be rainy weather with rest parameters as constant, which may lead to higher sales of cloth for rain. Hence, the possible effect may be that rainy items are kept near packaging or billing area during the rainy season. Moreover, the sample pattern P2 may indicate that the time range between 11 PM to 6 PM experiences greater sale of groceries. Hence, the possible effect may be that during this time range there should be more robots in the grocery section of the warehouse and racks in the grocery section should be pre-filled with items during such time. Additionally, the sample pattern P3 may indicate that the time range between 11 PM to 6 PM, the current day being a weekend, and the date being 1st of a month has an additive effect on overall sales. Thus, the possible effect may be to deploy more robots across all categories, robots should be charged to maximum capacity before this period, and counter measure drones may be deployed for cases where efficiency progressively degrades.

In a small scale simulation, the order scope may be O000, O001, . . . , O099, O100. There may be a current best situation and the automated system may have new orders coming in. Hence, the automated system may obtain alternative situations as deviation from the current best. Moreover, each of the 100 orders (O000-O100) may be simulated in the automated system of warehouse. Also, more robots may be put in action to ensure expedited energy and time saving. Hence, the simulations reach a trade-off between the two goals they were supposed to accomplish. For example, the outcome of the automated system may be completing the orders in a reward best of 21 minutes and 10J (reward points 125) compared to earlier best of 32 minutes and 12J (reward points 101).

Figure 7:
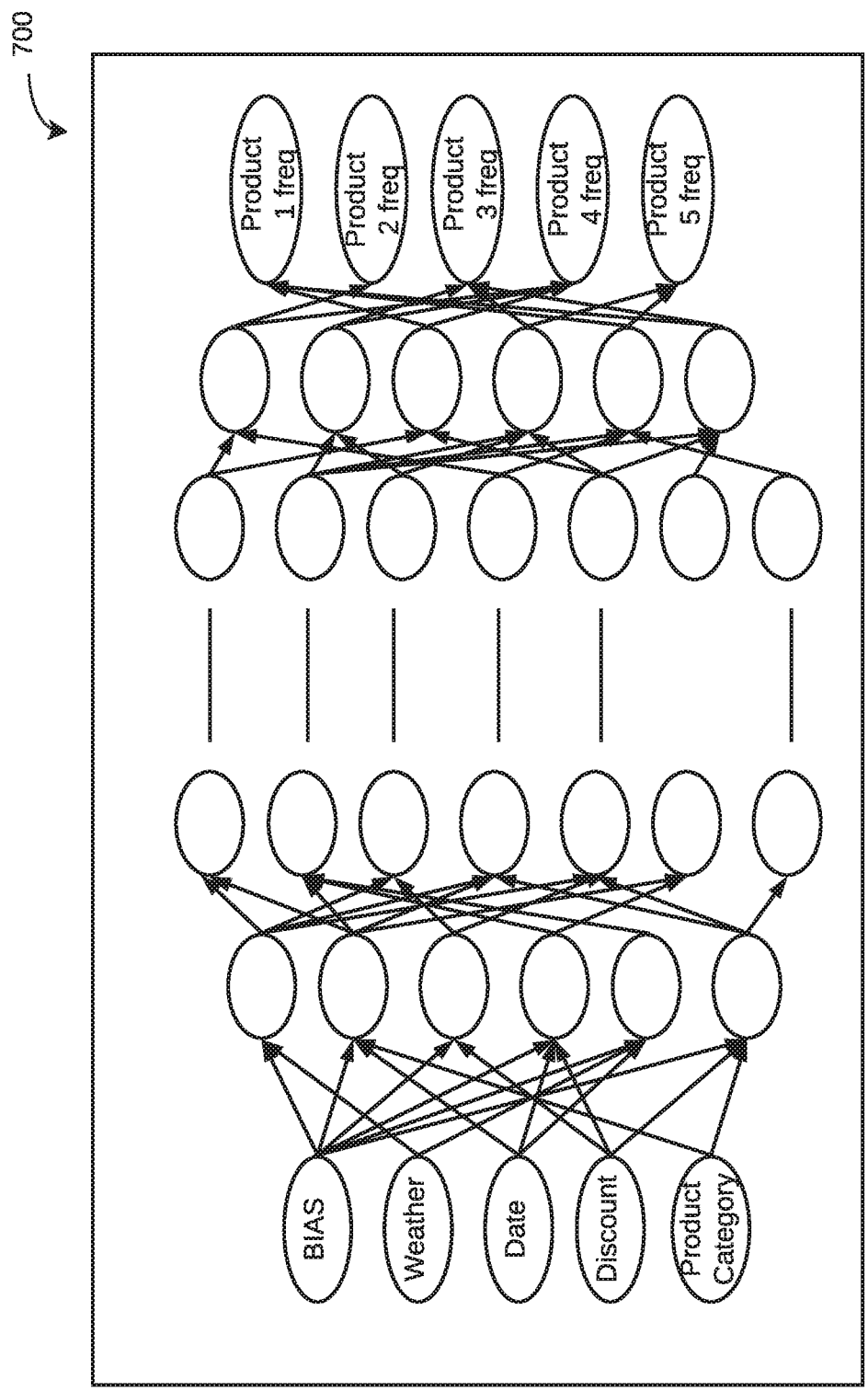
FIG. 7 illustrates a deep learning network for deriving weight of each of the plurality of factors, in accordance with an exemplary embodiment.

Referring now to FIG. 7, a deep learning network 700 for deriving weight of each of the plurality of factors is illustrated, in accordance with an embodiment. The deep learning network 700 may receive the plurality of parameters as input. The plurality of parameters may affect the decision for predicting a product's status in the warehouse. For example, as depicted in FIG. 7, the output may be frequency associated with various products. The frequency associated with a product may indicate the demand or purchases associated with that product. In the deep learning network 700, the task execution device 200 may change the weight-based interconnections of the plurality of factors. The plurality of factors may include bias, weather, date, discount, product's category, and the like.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 8:
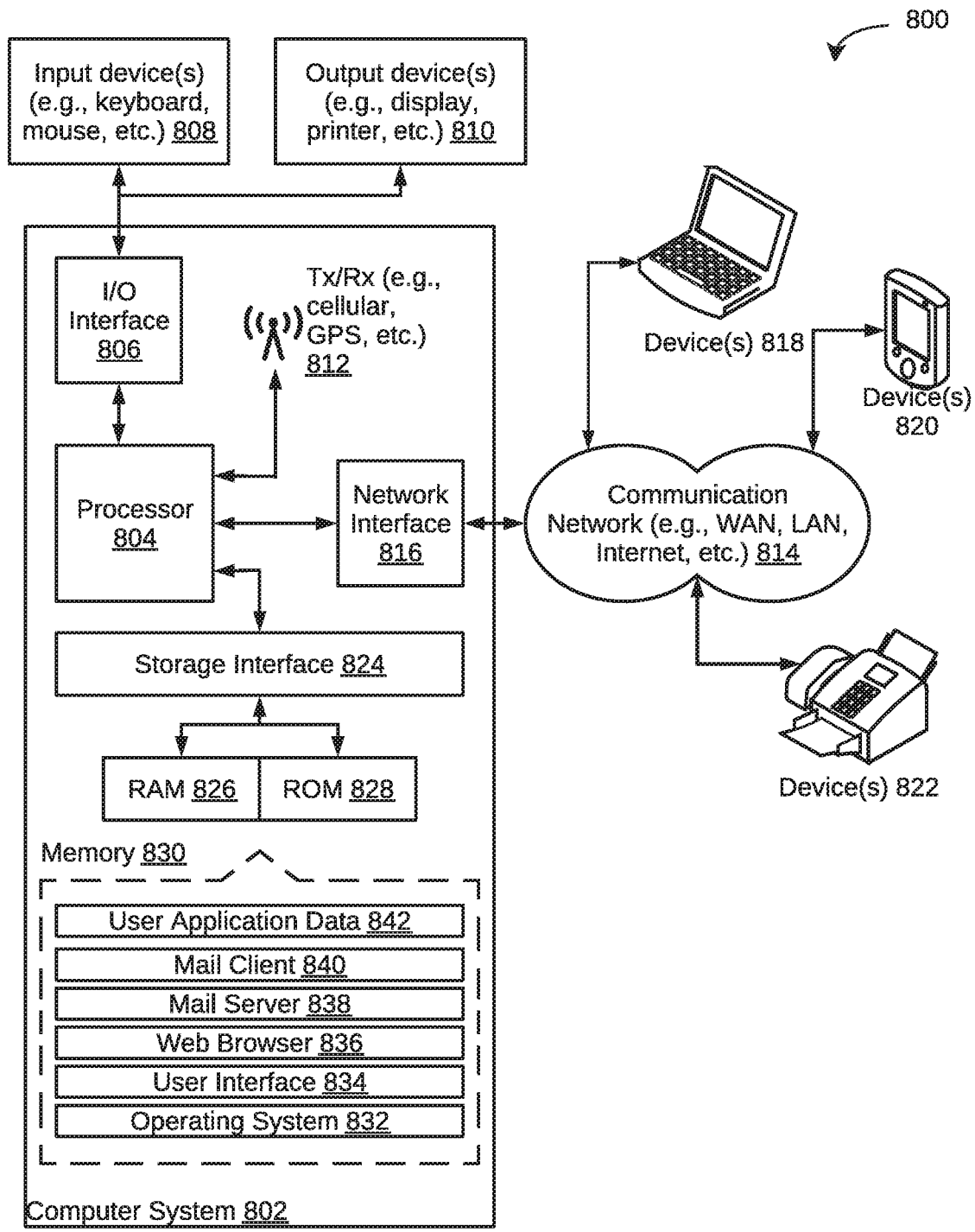
FIG. 8 is a block diagram of an exemplary computer system for implementing embodiments.

Referring now to FIG. 8, a block diagram of an exemplary computer system 802 for implementing various embodiments is illustrated. Computer system 802 may include a central processing unit ("CPU" or "processor") 804. Processor 804 may include at least one data processor for executing program components for executing user or system-generated requests. A user may include a person, a person using a device such as such as those included in this disclosure, or such a device itself. Processor 804 may include specialized processing units such as integrated system (bus) controllers, memory management control units, floating point units, graphics processing units, digital signal processing units, etc. Processor 804 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 804 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 804 may be disposed in communication with one or more input/output (I/O) devices via an I/O interface 806. I/O interface 806 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 806, computer system 802 may communicate with one or more I/O devices. For example, an input device 808 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 810 may be a printer, fax machine, video display (for example, cathode ray tube (CRT), liquid crystal display (LCD), light-emitting diode (LED), plasma, or the like), audio speaker, etc. In some embodiments, a transceiver 812 may be disposed in connection with processor 814. Transceiver 812 may facilitate various types of wireless transmission or reception. For example, transceiver 812 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 804 may be disposed in communication with a communication network 814 via a network interface 816. Network interface 816 may communicate with communication network 814. Network interface 816 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 814 may include, without limitation, a direct interconnection, local area network (LAN), wide area network (WAN), wireless network (for example, using Wireless Application Protocol), the Internet, etc. Using network interface 816 and communication network 814, computer system 802 may communicate with devices 818, 820, and 822. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 802 may itself embody one or more of these devices.

In some embodiments, processor 804 may be disposed in communication with one or more memory devices (for example, RAM 826, ROM 828, etc.) via a storage interface 824. Storage interface 824 may connect to memory 830 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 830 may store a collection of program or database components, including, without limitation, an operating system 832, user interface application 834, web browser 836, mail server 838, mail client 840, user/application data 842 (for example, any data variables or data records discussed in this disclosure), etc. Operating system 832 may facilitate resource management and operation of computer system 802. Examples of operating systems 832 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 834 may facilitate display, execution, interaction, manipulation, or operation of program components through textual or graphical facilities. For example, user interfaces may provide computer interaction interface elements on a display system operatively connected to computer system 802, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 802 may implement a web browser 836 stored program component. Web browser 836 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 802 may implement a mail server 838 stored program component. Mail server 838 may be an Internet mail server such as MICROSOFT® EXCHANGE® mail server, or the like. Mail server 838 may utilize facilities such as ASP, ActiveX, ANSI C++/C#, MICROSOFT .NET® programming language, CGI scripts, JAVA® programming language, JAVASCRIPT® programming language, PERL® programming language, PRP® programming language, PYTHON® programming language, WebObjects, etc. Mail server 838 may utilize communication protocols such as internet message access protocol (IMAP), messaging application programming interface (MAPI), Microsoft Exchange, post office protocol (POP), simple mail transfer protocol (SMTP), or the like. In some embodiments, computer system 802 may implement a mail client 840 stored program component. Mail client 840 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 802 may store user/application data 842, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments provide method and system for task execution in dynamic heterogeneous robotic environment. In particular, the method uses deep learning technique for task execution using the AGVs. Further the method may not be restricted in operation or application as long as the specific objectives may be present in the variable robotic environment. The potential usage of the method may be multi-faceted because the focus area is on achieving overall optimization of a floor including those of automated warehouses, factories industries, or the like.

Moreover, the method may be used to provide an end to end automation and eliminate the imprecisions, which often plague man-machine systems. Further, the method may have greater control over all aspects of the floor and may work to improve the low reward areas. Additionally, in the method, the AGVs may collaborate with each other and there is a behavior induced in the AGVs. In collaboration, the work performed by the AGVs will be greater work performed by sum of their parts. Hence, the method may have lower computational cost and system state may be developed and utilized until efficiency reaches below threshold of operation. Further, the method helps to reduce the manual effort and the workload, which further reduces cost of memory.

The specification has described method and system for task execution in dynamic heterogeneous robotic environment. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope disclosed embodiments being indicated by the following claims.

What is claimed is:

1. A method for task execution in dynamic heterogeneous robotic environment, the method comprising:
   extracting, by a task execution device, data associated with a plurality of data categories in response to identifying at least one current task, wherein the data is extracted from a plurality of data sources, and wherein each of the plurality of data categories is associated with at least one of the plurality of data sources;
   deriving, by the task execution device, a plurality of factors from the extracted data based on a deep learning network;
   determining, by the task execution device, a plurality of correlations among the plurality of factors based on the deep learning network, wherein the plurality of correlations comprise weighted relationship between two or more factors from the plurality of factors;
   deriving, by the task execution device, a plurality of sentiment parameters for a set of factors from the plurality of factors based on the plurality of correlations, wherein the plurality of sentiment parameters are hierarchical;
   simulating, by the task execution device, execution of the at least one current task by employing a plurality of robots based on each of the plurality of sentiment parameters applied to at least one associated factor from the set of factors;
   iteratively re-adjusting, by the task execution device, at least one of the plurality of sentiment parameters based on reinforcement learning performed on a result of the simulating, wherein the iterative re-adjustment is performed until each of the plurality of sentiment parameters are above a predefined threshold; and
   executing, by the task execution device, the at least one current task by employing the plurality of robots, based on each of the plurality of sentiment parameters applied to at least one associated factor from the set of factors in response to the iterative re-adjusting.

2. The method of claim 1 further comprising receiving the at least one current task requiring execution from a task pipeline.

3. The method of claim 2, wherein the extracting the data comprises:
   determining a current state of the task execution device, in response to receiving the at least one current task; and
   identifying the data based on the current state of the task execution device and the at least one current task received.

4. The method of claim 1, wherein the plurality of data sources comprises an environmental factors database and a historical database, wherein the historical database comprises at least one of order information, factory functioning information, external information, robot history information, or task handling information.

5. The method of claim 1, wherein the plurality of factors comprises at least one of date, day, time, product visibility, product character, or product category, and wherein each of the plurality of factors represents a neuron in the deep learning network.

6. The method of claim 1, wherein the determining the plurality of correlations among the plurality of factors comprises:
   assigning weights to relations between a set of factors from the plurality of factors to generated weighted relationship between the set of factors;
   analyzing the assigned weights based on a deep neural network; and
   re-adjusting the assigned weights based on a result of the analyzing.

7. The method of claim 1, wherein the hierarchy associated with a sentiment parameter of the plurality of sentiment parameters corresponds to at least one of roles, task allocation to the plurality of robots, robot functioning, or product categories.

8. The method of claim 1, wherein the simulating execution of the at least one current task comprises:
   determining a plurality of use cases for simulating execution of the at least one current task, wherein each of the plurality of use cases comprises application of each of the plurality of sentiment parameters to at least one associated factor from the set of factors; and
   assigning, for each of the plurality of use cases, at least one reward point to each of the plurality of robots, based on simulation of the at least one current task.

9. The method of claim 8, wherein the iteratively re-adjusting the at least one of the plurality of sentiment parameters comprises performing reinforcement learning based on the at least one reward point assigned to each of the plurality of robots, for each of the plurality of use cases.

10. A task execution device for task execution in dynamic heterogeneous robotic environment, the task execution device comprising:
a processor; and
a memory communicatively coupled to the processor, wherein the memory stores processor instructions, which, on execution, causes the processor to:
extract data associated with a plurality of data categories in response to identifying at least one current task, wherein the data is extracted from a plurality of data sources, and wherein each of the plurality of data categories is associated with at least one of the plurality of data sources;
derive a plurality of factors from the extracted data based on a deep learning network;
determine a plurality of correlations among the plurality of factors based on the deep learning network, wherein the plurality of correlations comprise weighted relationship between two or more factors from the plurality of factors;
derive a plurality of sentiment parameters for a set of factors from the plurality of factors based on the plurality of correlations, wherein the plurality of sentiment parameters are hierarchical;
simulate execution of the at least one current task by employing a plurality of robots based on each of the plurality of sentiment parameters applied to at least one associated factor from the set of factors;
iteratively re-adjust at least one of the plurality of sentiment parameters based on reinforcement learning performed on a result of the simulating, wherein the iterative re-adjustment is performed until each of the plurality of sentiment parameters are above a predefined threshold; and
execute the at least one current task by employing the plurality of robots, based on each of the plurality of sentiment parameters applied to at least one associated factor from the set of factors in response to the iterative re-adjusting.

11. The task execution device of claim 10 further comprising receiving the at least one current task requiring execution from a task pipeline.

12. The task execution device of claim 11, wherein the extracting the data comprises:
determining a current state of the task execution device, in response to receiving the at least one current task; and
identifying the data based on the current state of the task execution device and the at least one current task received.

13. The task execution device of claim 10, wherein the plurality of data sources comprises an environmental factors database and a historical database, wherein the historical database comprises at least one of order information, factory functioning information, external information, robot history information, or task handling information.

14. The task execution device of claim 10, wherein the plurality of factors comprises at least one of date, day, time, product visibility, product character, or product category, and wherein each of the plurality of factors represents a neuron in the deep learning network.

15. The task execution device of claim 10, wherein the determining the plurality of correlations among the plurality of factors comprises:
assigning weights to relations between a set of factors from the plurality of factors to generated weighted relationship between the set of factors;
analyzing the assigned weights based on a deep neural network; and
re-adjusting the assigned weights based on a result of the analyzing.

16. The task execution device of claim 10, wherein the hierarchy associated with a sentiment parameter of the plurality of sentiment parameters corresponds to at least one of roles, task allocation to the plurality of robots, robot functioning, or product categories.

17. The task execution device of claim 10, wherein the simulating execution of the at least one current task comprises:
determining a plurality of use cases for simulating execution of the at least one current task, wherein each of the plurality of use cases comprises application of each of the plurality of sentiment parameters to at least one associated factor from the set of factors; and
assigning, for each of the plurality of use cases, at least one reward point to each of the plurality of robots, based on simulation of the at least one current task.

18. The task execution device of claim 17, wherein the iteratively re-adjusting the at least one of the plurality of sentiment parameters comprises performing reinforcement learning based on the at least one reward point assigned to each of the plurality of robots, for each of the plurality of use cases.

19. A non-transitory computer-readable storage medium for task execution in dynamic heterogeneous robotic environment, having stored thereon, a set of computer-executable instructions causing a computer comprising one or more processors to perform steps comprising:
extracting data associated with a plurality of data categories in response to identifying at least one current task, wherein the data is extracted from a plurality of data sources, and wherein each of the plurality of data categories is associated with at least one of the plurality of data sources;
deriving a plurality of factors from the extracted data based on a deep learning network;
determining a plurality of correlations among the plurality of factors based on the deep learning network, wherein the plurality of correlations comprise weighted relationship between two or more factors from the plurality of factors;
deriving a plurality of sentiment parameters for a set of factors from the plurality of factors based on the plurality of correlations, wherein the plurality of sentiment parameters are hierarchical;
simulating execution of the at least one current task by employing a plurality of robots based on each of the plurality of sentiment parameters applied to at least one associated factor from the set of factors;
iteratively re-adjusting at least one of the plurality of sentiment parameters based on reinforcement learning performed on a result of the simulating, wherein the iterative re-adjustment is performed until each of the plurality of sentiment parameters are above a predefined threshold; and
executing the at least one current task by employing the plurality of robots, based on each of the plurality of sentiment parameters applied to at least one associated factor from the set of factors in response to the iterative re-adjusting.

\* \* \* \* \*